United States Patent [19]

Bryan

[11] Patent Number: 5,612,718
[45] Date of Patent: Mar. 18, 1997

[54] VARIABLY ADJUSTABLE CHAIR HAVING AN ADJUSTABLE ERGONOMIC KEYBOARD

[76] Inventor: Jed A. Bryan, 188 Linde Cir., Marina, Calif. 93933

[21] Appl. No.: 352,418

[22] Filed: Dec. 7, 1994

Related U.S. Application Data

[63] Continuation of Ser. No. 981,163, Nov. 24, 1992, abandoned.

[51] Int. Cl.⁶ .................................................. G09G 5/04
[52] U.S. Cl. .................. 345/168; 297/115; 297/411.2; 297/411.35; 297/411.36; 297/411.37; 297/411.38; 297/411.39
[58] Field of Search ............................ 345/168; 297/115, 297/411.2, 411.35, 411.36, 411.37, 411.38, 411.39

[56] References Cited

U.S. PATENT DOCUMENTS

| | | | |
|---|---|---|---|
| 657,033 | 8/1900 | Sanford | 108/4 |
| 685,956 | 11/1901 | Tesla | 375/35 |
| 1,279,120 | 9/1918 | Kellogg | 297/411.31 |
| 3,140,119 | 7/1964 | Offner . | |
| 3,765,720 | 10/1973 | Sakai . | |
| 3,906,369 | 9/1975 | Pitman et al. . | |
| 4,064,560 | 12/1977 | Baxter | 364/900 |
| 4,081,068 | 3/1978 | Zapp | 197/98 |
| 4,225,183 | 9/1980 | Hanagan et al. | 297/417 |
| 4,270,798 | 6/1981 | Harder | 297/411.31 |
| 4,374,497 | 2/1983 | Harmand | 108/4 |
| 4,378,553 | 3/1983 | McCall | 340/365 |
| 4,452,487 | 6/1984 | Plowman | 297/411 |
| 4,471,995 | 9/1984 | Wisnrewski | 297/411 |
| 4,589,697 | 5/1986 | Bauer et al. | 297/300 |
| 4,661,005 | 4/1987 | Lahr | 400/489 |
| 4,807,618 | 2/1989 | Auchruleck et al. | 128/878 |
| 4,913,393 | 4/1990 | Wood | 248/283 |
| 5,022,706 | 6/1991 | Bryan | 397/162 |
| 5,122,786 | 1/1992 | Rader | 340/711 |
| 5,143,422 | 9/1992 | Althofer et al. | 297/411 |
| 5,177,616 | 1/1993 | Riday | 358/254 |
| 5,281,001 | 1/1994 | Bergsten et al. | 297/411.24 |
| 5,311,210 | 5/1994 | O'Brien et al. | 345/168 |
| 5,407,249 | 4/1995 | Bonutti | 297/411.35 |

FOREIGN PATENT DOCUMENTS

| | | |
|---|---|---|
| 60-53360 | 3/1985 | Japan . |
| 1443952 | 7/1976 | United Kingdom . |

OTHER PUBLICATIONS

IBM Technical Disclosure Bulletin 20(10): 4250–4251 Mar. 1978.
Article entitled "Inventor Says Apple Stole Keyboard Idea" from the San Jose Mercury News written by Lee Gomes on or about Jan. 25, 1993 and starting at p. 5C.
Article by Steven Levy entitled "Honey, I Split the Keyboard" published in MacWorld Feb. 1990.
Weekly Reader Magazine, Edition 5—vol. 71, Issue 7—Oct. 23, 1992. (p. 4).
Letter to Weekly Reader Corp. from Kinesis with copy of article from New York Times (date unknown).

*Primary Examiner*—Mark R. Powell
*Assistant Examiner*—Vincent E. Kovalick
*Attorney, Agent, or Firm*—LaRiviere, Grubman & Payne

[57] ABSTRACT

Variably adjustable chair (100) having adjustable arms for optimal positioning by a user to attain greater comfort and operation with reduced stresses and tensions. Each adjustable arm assembly (198) and (199) includes keyboard supports (195) and (196) and auxiliary supports (145) and (146). Keyboard supports are for use with keyboard sections. Right and left keyboard sections (200) and (300) are divided for independent right- and left-hand actuation. More specifically, a standard computer keyboard, QWERTY keyboard layout, with a numeric data pad, is divided at an optimum location for normal left-and right-hand usage. Each keyboard section includes keys which are optimally positioned for natural orientation actuation by an operator's thumb. Wherein, each adjustable arm assembly and each keyboard section is ergonomically designed for an operator's natural arm-hand-wrist contours for optimal use and comfort with reduced stresses and tensions.

7 Claims, 14 Drawing Sheets

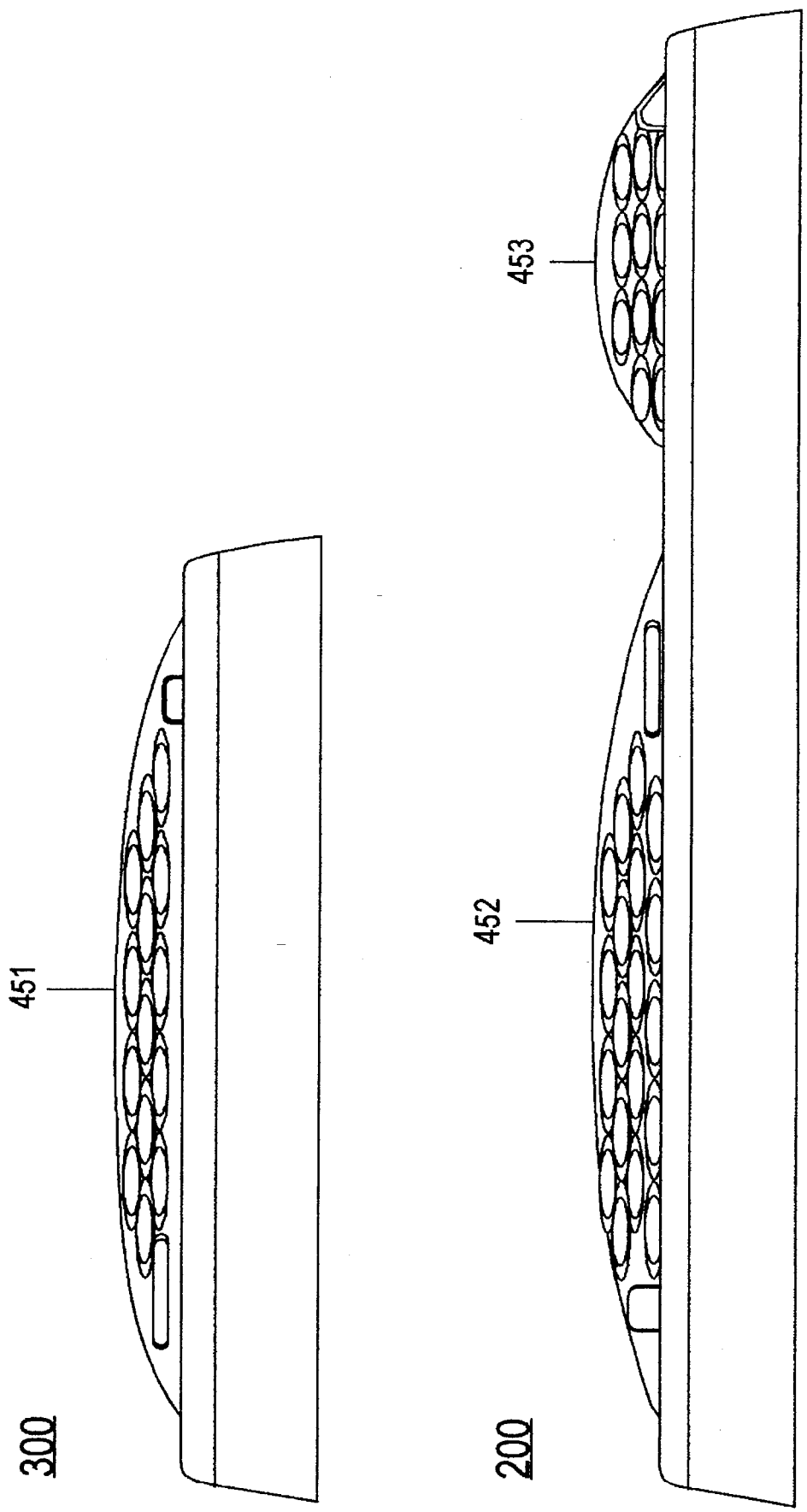

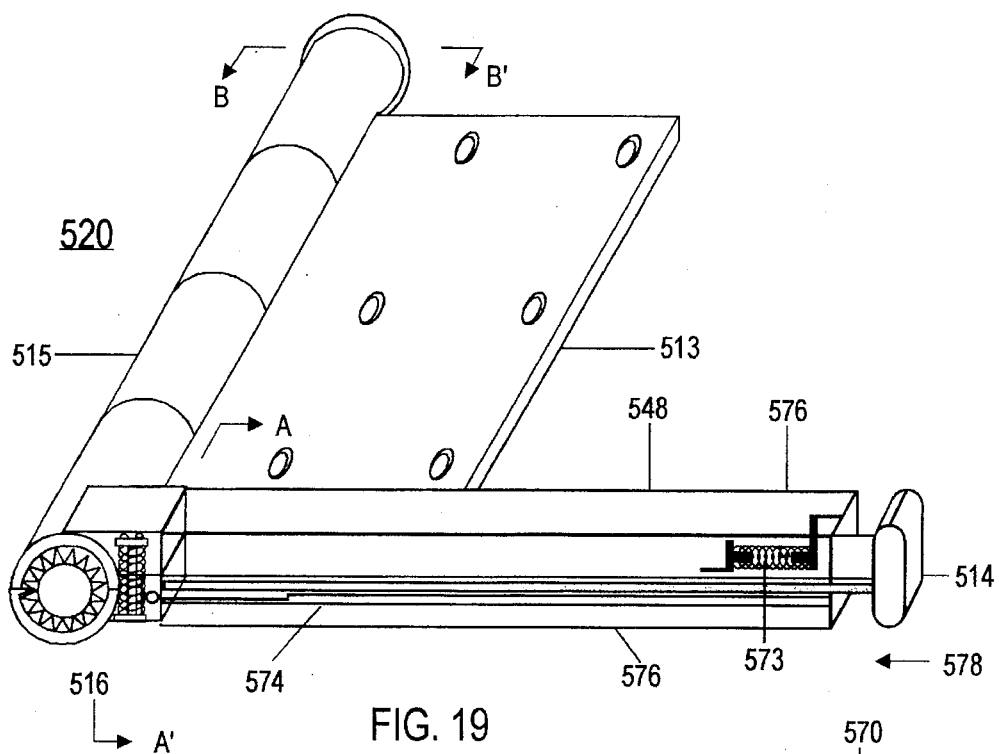
FIG. 19
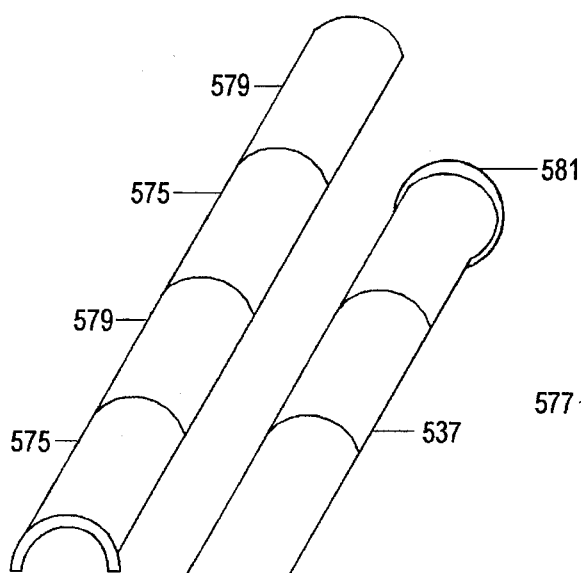
FIG. 20
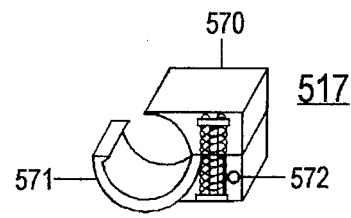
FIG. 21
FIG. 22
FIG. 23
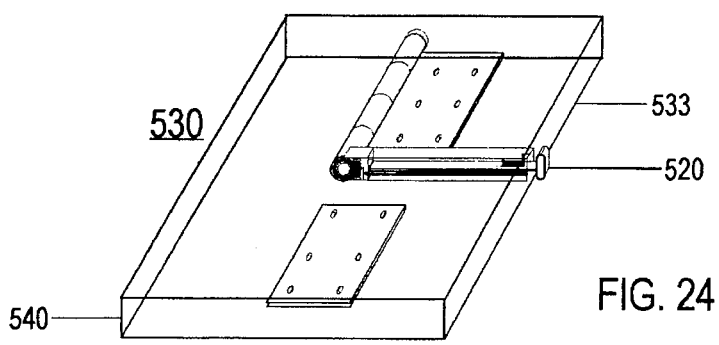
FIG. 24

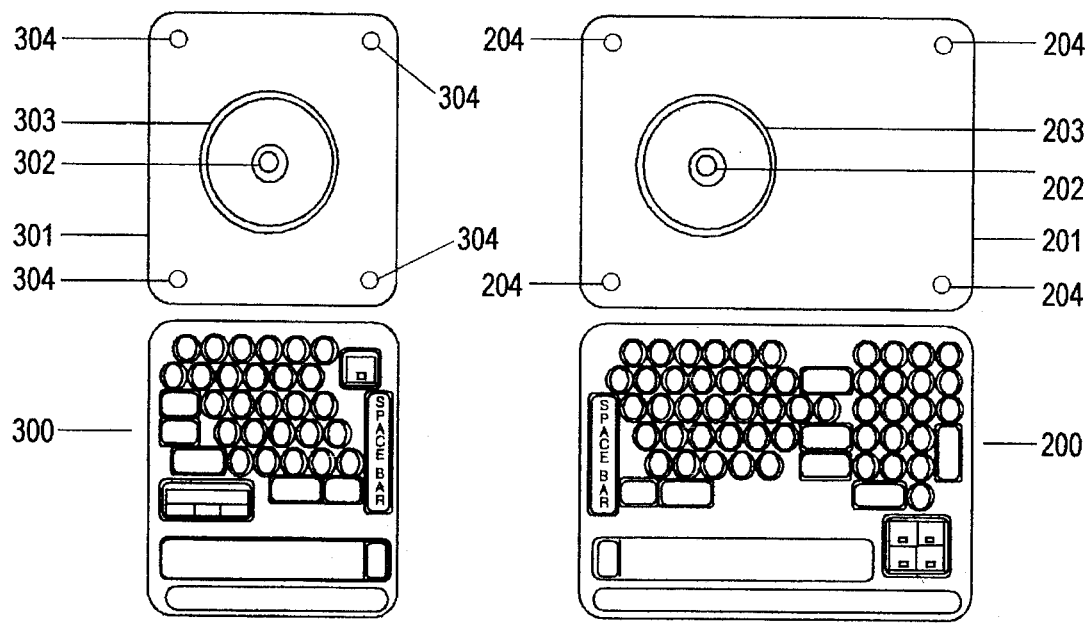
FIG. 27
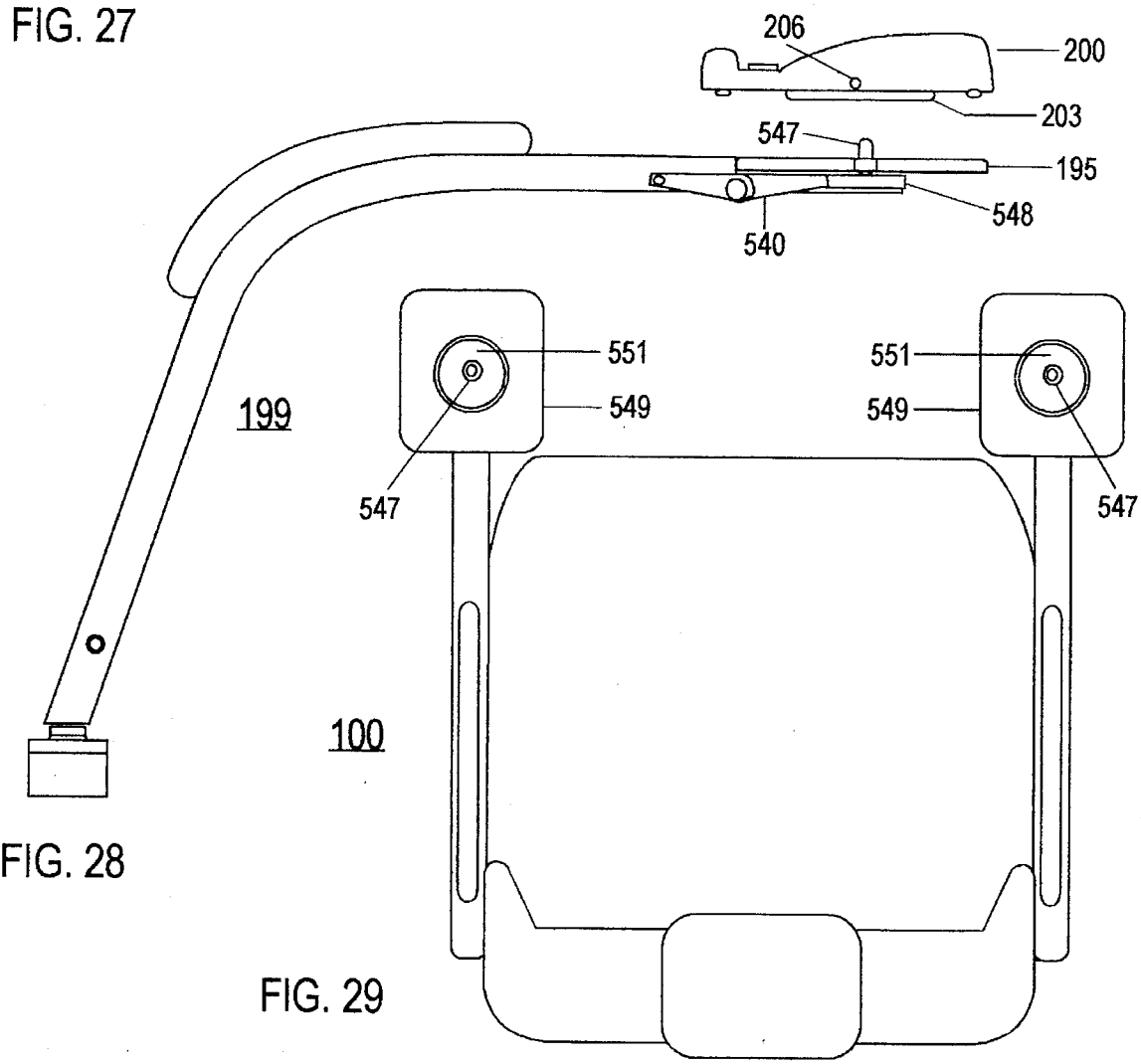
FIG. 28
FIG. 29

VARIABLY ADJUSTABLE CHAIR HAVING AN ADJUSTABLE ERGONOMIC KEYBOARD

CROSS REFERENCE TO RELATED APPLICATION

This is a continuation of application Ser. No. 07/981,163, filed Nov. 24, 1992, now abandoned.

TECHNICAL FIELD

The present invention relates to variably adjustable chairs and keyboards. More specifically, the present invention relates to variably adjustable chairs which are adapted with foldable supports to provide a user with support for a divided keyboard for computers and the like. The divided keyboard of the present invention is logically divided into two parts which are mounted on foldable supports disposed and/or near one end of each of the arm rests on the chair of the present invention. The two parts of the keyboard are interoperable for use with an operator's right and left hand, respectively. Each part of the keyboard has keys which are arranged in comparable layout to keys on standard keyboards presently used, and has several keys which are reconfigured for more ergonomic accessibility for actuation.

BACKGROUND ART

With the complexities of society ever increasing, human interaction with machines having keyboards and other input devices among which computers and other electronic devices are included, becomes more and more complex. Typically, a person who is operating a computer is seated in front of a keyboard. The keyboard is connected to the computer, and a monitor is also connected to the computer. The individual can observe his interaction with by observing the monitor. This interaction typically occurs in the form of actuating keys on the keyboard. However, not all interaction with computers is limited to actuating keys on keyboards. In fact, track balls, roller balls, graphic pads, voice recognition systems or a "mouse" are all used for interaction with a computer.

Sustained interaction with computers and other machines can lead to eye strain, tension headaches, shoulder, arm, wrist, hand or finger muscle strain, carpal tunnel syndrome, trauma, rheumatoid arthritis or edema of pregnancy. Therefore, a variably adjustable chair which reduces stresses and tensions experienced by an operator is desirable. Furthermore, what is desirable is a variably adjustable chair which allows an operator freedom of movement away from a computer or other machine. Thus, an operator would not feel tied to the machine. Also, what is desirable is a divided keyboard in combination with a variably adjustable chair so that an operator does not feel trapped in his or her chair.

For example, in U.S. Pat. No. 5,022,706, invented by and issued to the inventor of the present invention, support tables suitable for supporting a computer keyboard in front of a user and adapted for a rotatable attachment to the side arms of a chair are disclosed. Each support table is hingedly attached to the front of each side arm so as to be pivotable about each of two orthaginal axis. The support tables therein are foldable from a generally horizontal position disposed above the seat of the chair and in front of the chair side arms and the user to a stored position disposed adjacent to the outside sides when not in use. Therein, a keyboard was placed across support tables in front of the user. Thus, a user positioned in the chair is virtually confined to the chair by having this keyboard restricting his or her egress and ingress to and from the chair. In U.S. Pat. No. 5,022,706, the adjustable keyboard chair was not variably adjustable to the operator's individual desires for optimum position and comfort. In that patent, the adjustable keyboard chair was not ergonomically designed for adaptation to the peculiarities of each individual's human physical characteristics.

In U.S. Pat. No. 4,064,560 (hereinafter "Baxter"), a master keyboard terminal is provided to communicate with a programmable control unit. In that patent, auxiliary keyboard terminals are connected to the master terminal, and utilize a substantial portion of the logic circuitry located in the master terminal. The auxiliary terminals disclosed in that patent are two numeric data pads. That patent discloses an apparatus directed to reducing the total number of logic components required in a typical system described therein. However, Baxter does not teach or disclose a divided keyboard with interoperable halves. Moreover, Baxter does not teach or disclose reconfiguration of a standard keyboard layout for improved ergonomic accessibility for key actuation. Furthermore, Baxter does not teach or disclose a variable adjustable chair having a divided keyboard.

In U.S. Pat. No. 4,081,068 (hereinafter "Zapp"), a keyboard, actuatable with the aid of fingers of at least one hand is described. The keyboard is described in association with a typewriter. The keyboard disclosed therein includes a hand rest for the ball of the thumb or wrist of the hand, standard keys arranged on a curve for the fingers of each hand corresponding to the natural disposition of the finger-tips for use without being tensioned. It is also disclosed therein two separate thumb keys, a left thumb key and a right thumb key. However, Zapp does not teach or disclose a divided keyboard with interoperable halves. Moreover, Zapp does not teach or disclose a thumb key which is adaptable for varying thumb lengths. Furthermore, Zapp does not disclose a variably adjustable chair for reducing stresses and tensions in combination with an adjustable ergonomic keyboard.

In U.S. Pat. No. 4,378,553 (hereinafter "McCall"), an electromechanical interactive terminal system is disclosed. In McCall, a keyboard provides two separate and distinct keyboard units, one of which includes the keys normally activated by the right hand while the other has the keys conventionally assigned for use by the left hand. The two separate keyboard units can be used in various positions as being affixed to a support member, so as to be held in spaced-apart relationship contiguous to the hands of an operator with his arms apart and supported at rest. However, McCall does not teach or disclose a variably adjustable chair for reducing stresses and tensions. Moreover, McCall does not teach or disclose reconfiguration of a standard keyboard layout for improved ergonomic accessibility for actuation. Furthermore, McCall does not teach or disclose a variably adjustable chair in combination with a divided keyboard for improved ingress and egress from the chair.

In U.S. Pat. No. 4,661,005 (hereinafter "Lahr"), a keyboard arrangement for reducing stress and tension experienced by a human operator during communication with an information processing machine is disclosed. The keyboard therein discloses having keys thereon arranged in a conventional QWERTY keyboard system splitable into first and second sections. Also, disclosed therein, an adjustable mechanical mounting arrangement is provided for insuring positional stability for the keyboard sections. However, Lahr does not teach or disclose a variably adjustable chair in combination with an ergonomic adjustable keyboard for reducing stresses and tensions. Moreover, Lahr does not teach or disclose reconfiguration of a standard keyboard layout for improved ergonomic accessibility for actuation of a key. Furthermore, Lahr does not teach or disclose a variably adjustable chair in combination with a divided keyboard for improved ingress and egress from the chair.

Thus, a variably adjustable chair which conforms to the individual peculiarities of an operator for reduced physiological and psychological tensions and stresses and for optimum positioning for communication with a computer or other type of machine is desirable. Furthermore, an ergonomically adjustable keyboard for use with a variably adjustable chair which allows mobility away from a computer or other machine, and does not excessively limit the egress and ingress from the aforesaid chair is desirable. Moreover, an ergonomic adjustable keyboard optimally designed for reduced stresses and tensions to an operator's hand and wrist is desirable. Furthermore, a variably adjustable chair which is ergonomically designed to accommodate individual physical peculiarities of an operator is desirable. Additionally, a keyboard which allows an operator additional freedom of movement away from a monitor or other display device is desirable. Also, an ergonomic keyboard which is configured for improved accessibility for key actuation is desirable. Other desirable advantages over prior disclosures will become apparent from which follows herein.

DISCLOSURE OF INVENTION

A variably adjustable chair designed according to the principles of the present invention allows the user to adjust for optimal comfort, reduced stress, and reduced tension when using a computer or other machine. Moreover, the present invention relates to variably adjustable chairs which adjust to a human operator's individual needs, wherein the operator can adjust the arms of the present invention for an optimum position of comfort in order to reduce physical stresses and tensions in the shoulders, arms, wrists, hands and fingers, and to an optimum position for operation therein. Furthermore, the present invention comprises an ergonomically designed arm which conforms to the physical features of a human operator, and therein provides for reduced stresses and tensions to the operator.

The present invention comprises at least one adjustable arm. The present invention can also have two adjustable arms. The adjustable arms can be moved forward, away from an operator, or backward, closer to an operator. The adjustable arms can also be adjusted or moved up and down with respect to a seated operator. The adjustable arms according to the present invention can also be adjusted away from a seated operator or into a seated operator. With all of these movements or adjustments of the present invention, the adjustable arms can be tilted forward or backward for adjustment by an operator. The adjustable arms according to the present invention have an ergonomic arm shape with ergonomic arm pads thereon. The adjustable arms of the present invention also comprise keyboard supports and auxiliary supports which can be folded away when not in use or folded in position for use by an operator.

An ergonomic adjustable keyboard and chair designed according to the principles of the present invention cooperate to allow a user to transmit information to a computer or other machine, such that the user's wrists and hands are conveniently supported by arm rests such that stresses and tensions are reduced. A divided keyboard designed according to the principles of the present invention allows the user to independently and interoperably operate a computer or other machine with his or her right and left hand. Furthermore, a divided keyboard ergonomically designed having reconfigured keys for reduced stresses and tensions to an operator and further for improved accessibility for key actuation. Moreover, a divided keyboard made with wireless connection to a computer for increased mobility away from the computer. A divided keyboard and variably adjustable chair combination according to the present invention allows for the user to have a greater degree of freedom of movement from both the computer and/or other machine, as well as, the variably adjustable chair of the present invention.

Other features of the present invention are disclosed or apparent in the Best Mode Of Carrying Out The Invention section of the disclosure herein.

BRIEF DESCRIPTION OF DRAWINGS

For understanding of the present invention, reference is made to the accompanying drawing in the following Best Mode Of Carrying Out The Invention section of the disclosure of the present invention. In the drawing:

FIG. 12 is a front view of right and left keyboard sections of the present invention.

FIGS. 19–24 show an adjustable hinge according to the present invention.

FIGS. 24–26 show a hinge according to the present invention.

FIGS. 27–29 show a mechanism for mounting keyboard sections according to the present invention.

BEST MODE FOR CARRYING OUT THE INVENTION

Figure 1:
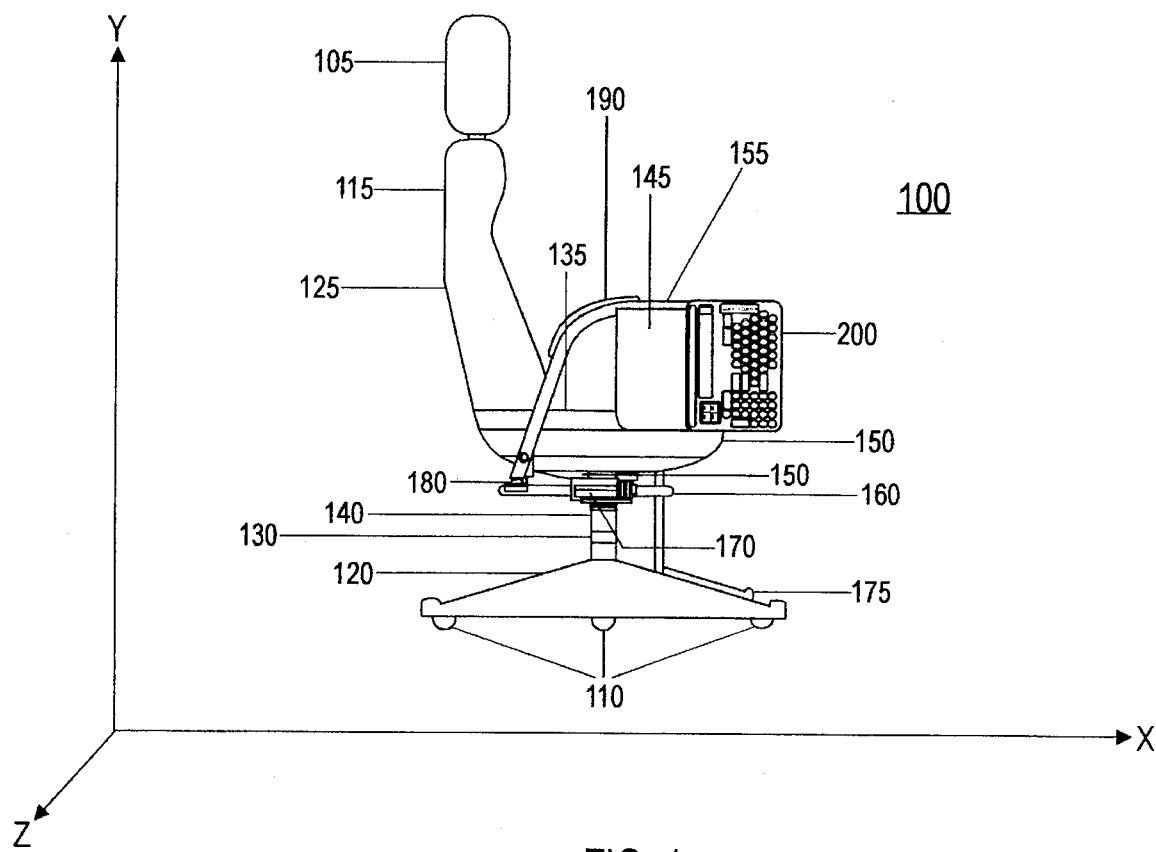
FIG. 1 is a side view of the present invention with right auxiliary table top, keyboard support and keyboard section in a fold away or down position.

Referring now to Figures (FIGS.) 1–3, a variably adjustable chair 100 constructed according to the principles of the present invention is shown. Variably adjustable chair 100 comprises casters 110, base 120, adjustable collar 130, adjustable shaft 140, seat base assembly 150, rod 160, locking sleeve 170, ball joint 180, right keyboard section 200, adjustable head rest 105, back support 115, tilt mechanism 125, seat 135, auxiliary support 145, cantilevered arm 155, adjustable footrest 175, right keyboard support 195, bolt 165, pneumatic linkage 185, and arm pad 190. Only the right side of variably adjustable chair 100 is shown; however, adjustable arm assembly 199 can have equivalent parts for the right and left sides of variably adjustable chair 100, duplicate description of which has been omitted in order to prevent unnecessary obscuring of the description of the present invention.

Casters 110 are rotationally coupled to base 120 for movement of chair 100. Adjustable collar 130 is connected to base 120 in a manner which allows adjustable shaft 140 to be adjustably positioned for height. Adjustable shaft 140 in the present invention can have threads for threading into adjustable collar 130, or can be pneumatically controlled as is well known in the art of the present invention. Coupled to adjustable shaft 140 is seat base assembly 150.

Seat base assembly 150 is connected to seat 135. Seat base assembly 150 is also connected to locking sleeve 170. Locking sleeve 170 defines a bore, not shown, for rod 160. Rod 160 is adjustable along the X-axis in order to provide front-to-back adjustment of adjustable arm assembly 199. Rod 160 can be locked into position with locking sleeve 170. Locking sleeve 170 can comprise clamping means for locking rod 160 into a desired position. Any variety of clamping means well-known in the art of the present invention can be used. Additionally, locking sleeve 170 need not lock rod 160 in place, rather rod 160 can be pneumatically or otherwise adjusted as described elsewhere in this specification.

Connected to rod 160 is ball joint 180. Attached to ball joint 180 is cantilevered arm 155. Ball joint 180 allows cantilevered arm 155 to be moved rotationally in the plain form by the X-axis and Z-axis, as well as, vertically and horizontally in the plain form by the X-axis and Y-axis. Attached to cantilevered arm 155 is bolt 165.

Figure 9:
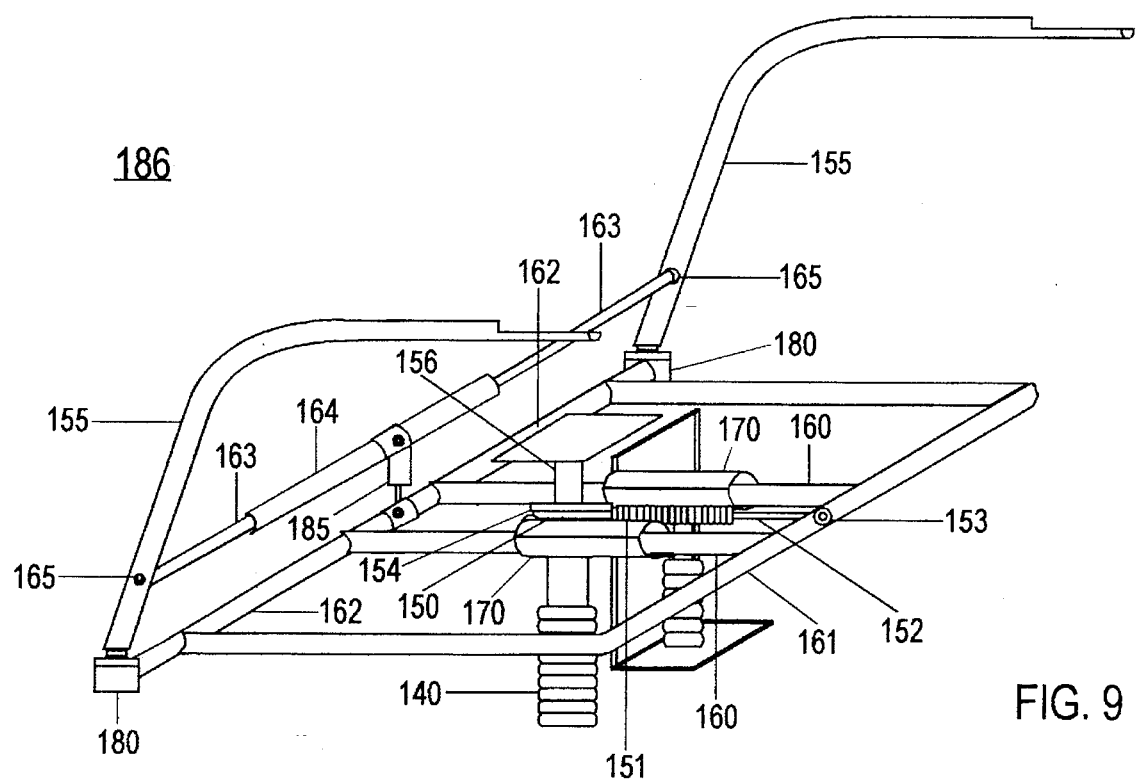
FIG. 9 shows an undercarriage of the present invention.
Figure 10:
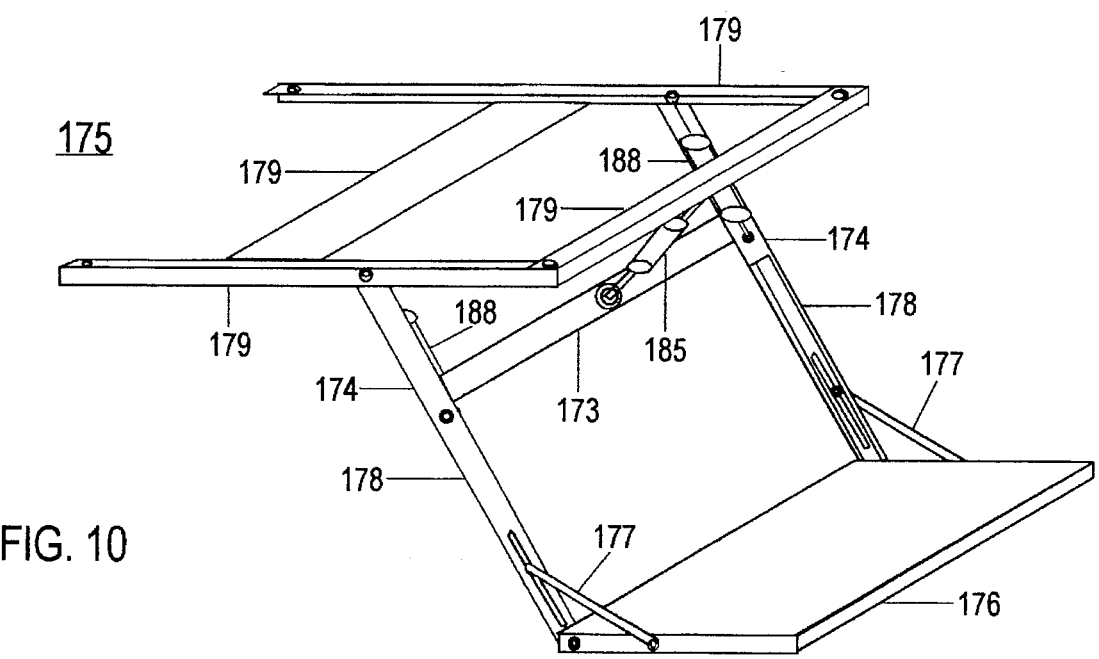
FIG. 10 shows an adjustable footrest of the present invention.
Figure 11:
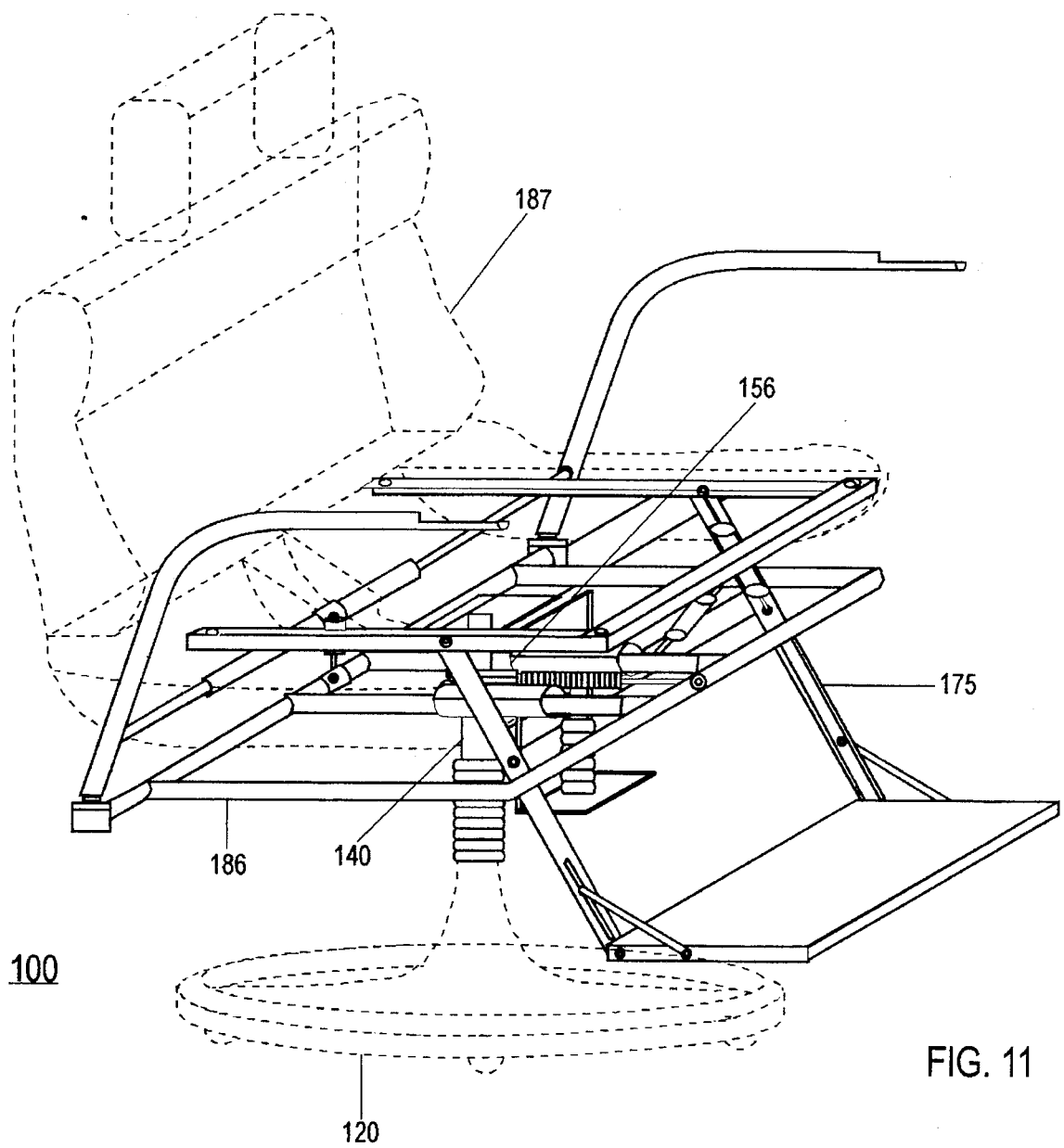
FIG. 11 shows the variably adjustable chair of the present invention with the combination of FIGS. 9 and 10.
Figure 15:
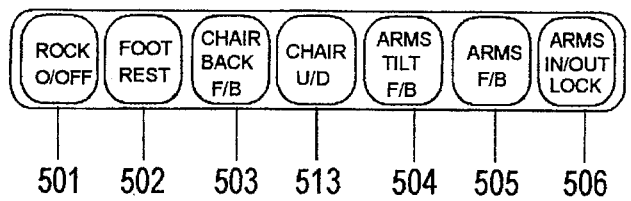
FIG. 15 shows a control panel according to the present invention.

Referring to FIGS. 9–11, undercarriage 186, adjustable footrest 175, support assembly 121 and a skeletal version of chair 100 are shown.

Undercarriage 186 comprises ball joint 180, bolt 165, cantilevered arm 155, connecting rod 163, pneumatic linkage 185, pneumatic linkage 164, seat base assembly 150, hole 154, adjustable stand 156, connecting rod 162, frame 161, adjustable shaft 140, connector 153, shaft 152, pneumatic device 151, rod 160, locking sleeve 170 and substantially equivalent of pairs of elements therein. Adjustable shaft 140 is coupled to seat base assembly 150. Adjustable stand 156 can be fitted and adjusted into hole 154 of seat base assembly 150 for supporting a seat. Pneumatic device 151 is any of the well-known pneumatic devices of the prior art of the present invention. As is known in the art, pneumatic devices like pneumatic device 151 can be adjusted with a means well known in the art coupled to a shaft 152 for releasing pneumatic device 151. Thus, a user can individually adjust the positioning of arms 155 with respect to their body. Moreover, as described elsewhere in this specification, pneumatic device 151 can be optionally controlled with a control button to avoid cumbersome manual adjustment. Coupled to seat base assembly 150 is locking sleeve 170. Rod 160 passes through locking sleeve 170. In the preferred embodiment of the present invention, rod 160 fits into locking sleeve 170 with minimal allowance for movement. Fitting rod 160 through locking sleeve 170 prevents unwanted movement, i.e., wobbling. Rod 160 is connected to frame 161 and connecting rod 162. Frame 161 provides additional support for undercarriage 186, and thus is optional. For example, frame 161 may just bridge rods 160 to prevent disengagement from locking sleeve 170.

Connecting rod 162 is connected to ball joint 180 and pneumatic linkage 185. Pneumatic linkage 185 is connected to pneumatic linkage 164. Pneumatic linkage 164 is coupled to connecting rod 163. Connecting rod 163 is connected to cantilevered arm 155 through bolt 165.

Pneumatic linkage 164 in the preferred embodiment of the present invention allows cantilevered arms 155 to be individually adjusted. However, pneumatic linkage 164 can provide for simultaneous adjustment of cantilevered arms 155. In other words, pneumatic 164 could in essence comprise two pneumatic linkages each for interoperably controlling either the right or left arm of the chair of the present invention. Pneumatic linkages 164 and 185 are well-known in the art of the present invention. Moreover, devices other than pneumatic can be used for adjusting cantilevered arms 15. For example, hydraulics, electric motors, spring locking mechanisms, and other types of linkages well-known in the art of the present invention, can be employed.

Through pneumatic linkages 185 and 164, cantilevered arms can be adjusted as coupled to ball joints 180 in an up and down motion and/or a lateral motion. Also, as is known in the art of the present invention, pneumatic linkages 164 and/or 185 can operate such that mere movement of cantilevered arm 155 allows for cantilevered arm to be locked into a desired position. Typically, these types of devices are electronically controlled; however, in any event, these devices are well-known in the prior art of the present invention.

Thus, additional control means for adjusting pneumatically linkages 164 and/or 185 in place and therein locating cantilevered arm or arms 155 in place may be required. However, as described elsewhere in this specification, control means can be used for controlling pneumatic linkages. For example, pneumatic devices in the control and operation of chairs are well-known in the art of the present invention. A variety of pneumatic devices could be used in practicing the art as taught by the present invention. By way of example and not limitation, pneumatic linkage 185 and/or 164 could be connected to an air compression device not shown through an air line for unlocking and then locking therein cantilevered arm 155 into a desired position with use of operator controls.

Adjustable foot rest 175 comprises footbase 176, adjustable brackets 178, slidable members 177, pneumatic linkages 185, sleeve 174, frame 179, support 173 and pneumatic linkages 188. Footbase 176 is coupled to adjustable brackets 178 through slidable members 177. Adjustable brackets 178 slidably fit into sleeve 174 which can be adjusted with pneumatic linkages 188. Control means for adjusting pneumatic linkages 188 are described elsewhere in this specification. Sleeves 174 are connected to frame 179 and support 173. Also connected to frame 79 and support 173 is pneumatic linkage 185. Pneumatic linkage 185 can be used to adjust for forward or backward movement of adjustable footrest 175. Control for adjusting pneumatic linkage 185 is described elsewhere in this specification.

Referring to FIG. 11, a skeletal view of chair 100 is shown. Also shown are adjustable footrest 175, undercarriage 186, base 120 and chair silhouette 187. Chair silhouette 187 is a silhouette of cushions which can be used with the present invention. As shown, adjustable footrest 175 and undercarriage 186 are coupled through adjustable stand 156. Additionally, base 120 is coupled to undercarriage 186 through adjustable shaft 140.

Figure 2:
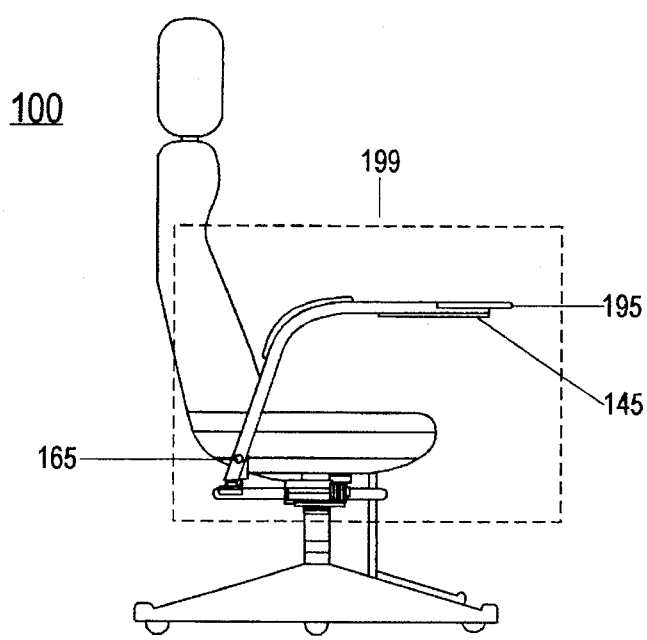
FIG. 2 is a side view of the variably adjustable chair with right auxiliary support and keyboard support in a use or upright position.
Figure 3:
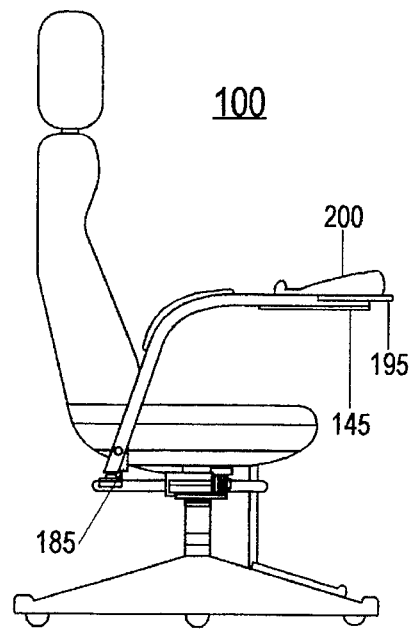
FIG. 3 is a side view of the present invention with right auxiliary support keyboard support and keyboard section in the up or use position.

Referring to FIGS. 1–3, cantilevered arm 155 is ergonomically shaped to the contour of a human arm. Additionally, arm pad 190 is connected to cantilevered arm 155. Arm pad 190 also conforms to the physical structure of a human arm. Wherein, cantilevered arm 155 and arm pad 190 are more comfortable.

Also connected to cantilevered arm 155, are right keyboard support 195 and right auxiliary support 145. In FIG. 1, right auxiliary support 145 and right keyboard table top 195, not shown, are in the down or non-use position. In FIGS. 2 and 3, right auxiliary support 145 and right keyboard support 195 are shown in an upright or use position. The present invention teaches a variety of upright or use-positions, not shown here, but described later in this specification. Also shown in FIG. 1 is right keyboard section 200 in the down or non-use position. Right keyboard section 200 is attached to right keyboard support 195, not shown. In FIG. 3, right keyboard section 200 is attached to right keyboard support 195. Right keyboard section 200 is shown in an up or use position; however, the present invention teaches a variety of use positions as disclosed later in this specification.

Also, disclosed are back support 115, adjustable head rest 105, and tilt mechanism 125. Adjustable head rest 105 is connected to back support 115. Adjustable head rest 105 can be adjusted to accommodate each individual operator's own torso requirements. Back support 115 is connected to seat 135 through tilt mechanism 125. Through tilt mechanism 125, back support 115 can be adjusted to accommodate each individual operator's physical requirements.

Figure 4:
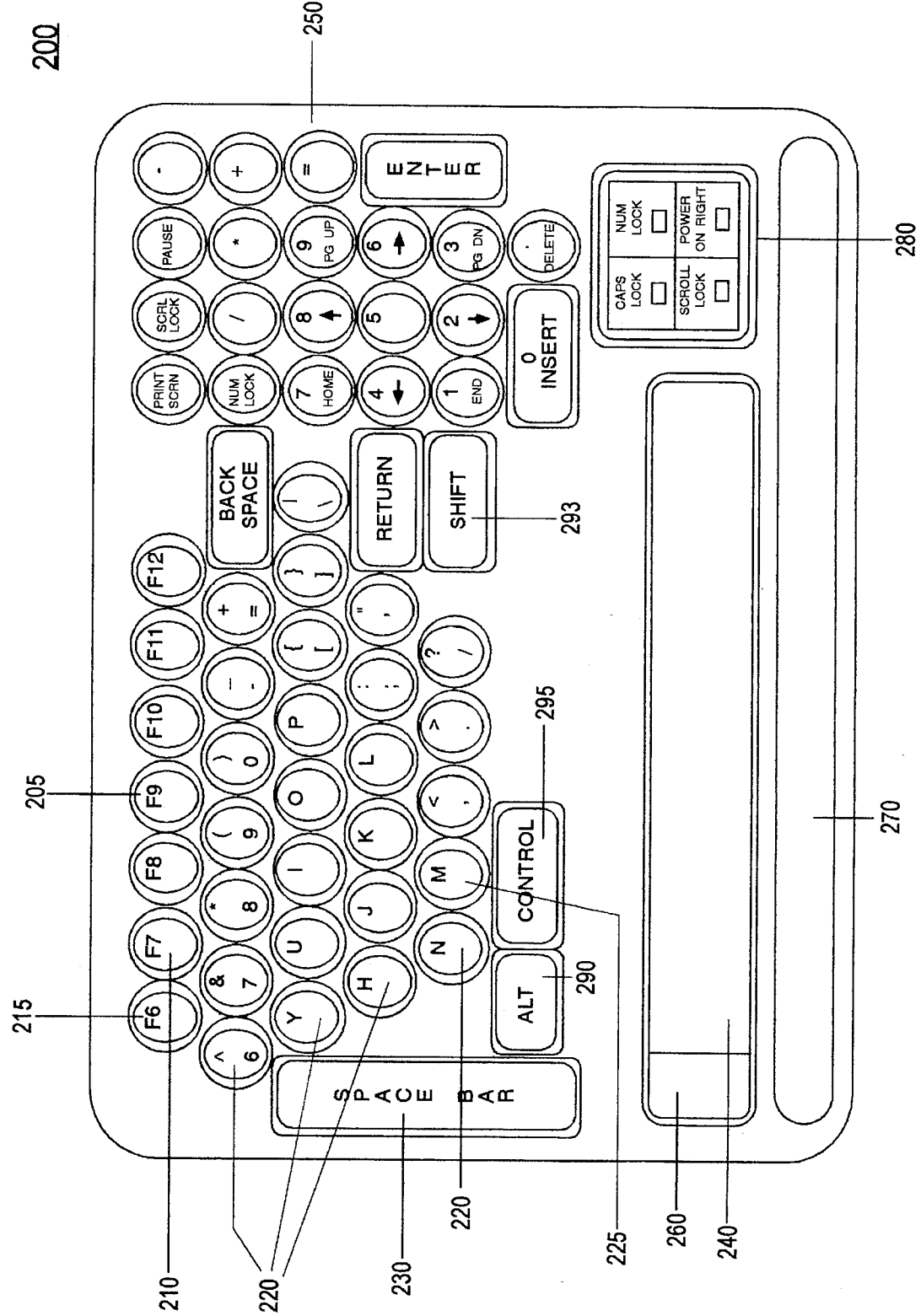
FIG. 4 is a top view of a right keyboard section of the present invention.
Figure 5:
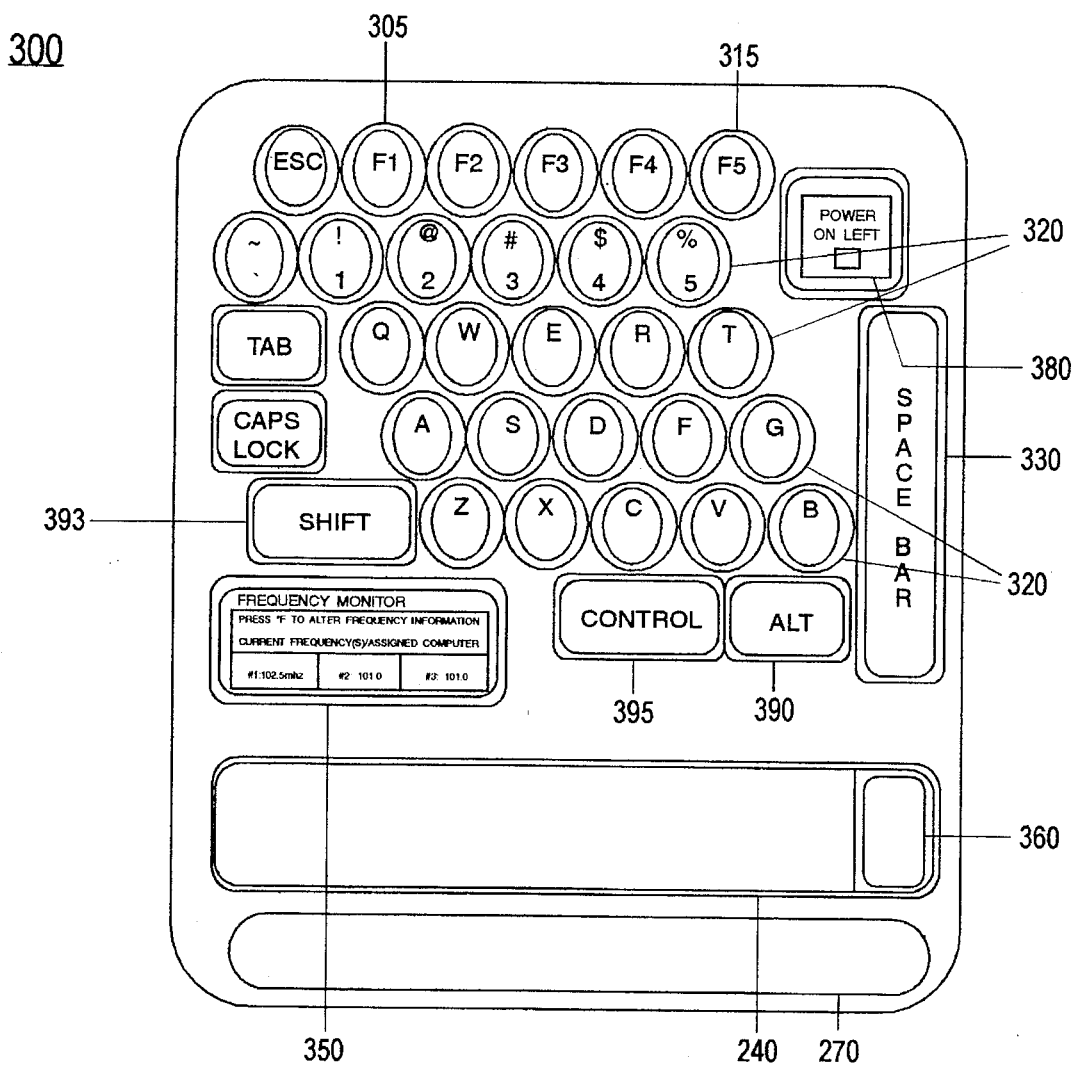
FIG. 5 is a top view of a left keyboard section of the present invention.
Figure 6:
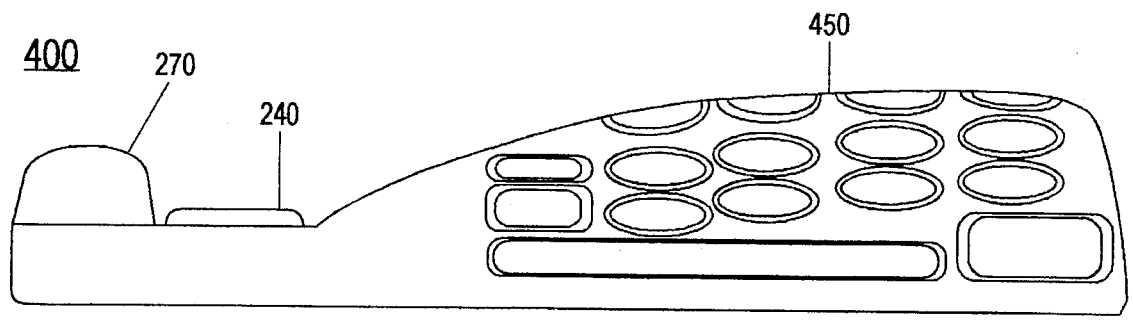
FIG. 6 is a side view of a keyboard section of the present invention.

Referring now to FIGS. 4–6, right keyboard section 200 and left keyboard section 300, as well as, a profile of a keyboard section 400, are shown.

Right keyboard section 200 comprises keyboard keys 205, numeric keypad 250, end grip slot 240, release button 260, wrist pad 270 and on/off indicator 280. Right keyboard section 200 is one-half a typical standard computer keyboard with some alterations and additions. Right keyboard section 200 is the right half of a standard QWERTY standard keyboard. The keyboard has been divided along standard keys 220. Dividing along standard keys 220 is determined by normal typing actuation by the right hand. Moreover, function keys 210 have been divided at function key 215 as is the normal division for actuation by the right hand. Shift key 293 is located in a typical position in a standard QWERTY keyboard for upper case letters and for actuation by the right most digit on the right hand, i.e., "the pinky." However, space bar 230, Alt key 290 and Control key 295 have been repositioned for more natural access. Space bar 230 is located in natural proximity to placement of an operator's right thumb for actuation by the thumb. Notably, thumbs of varying lengths are easily accommodated by space bar 230 due to its transverse length and placement. Alt key 290 is located in natural proximity to an operator's right thumb for easy actuation by the index finger on the right hand of the operator. Also, Control key 295 is similarly situated as Alt key 290.

Moreover, keyboard keys 205 can be color coded. For example, key 225 could be a light blue. Furthermore, function keys could be colored differently than function, letter or numeric keys. For example, all function keys could be colored orange and all typewriter and/or numeric keys could be colored blue. Furthermore, keyboard keys 205 could be back-lit for use in an environment that lacks ambient or artificial light, such as is typical of air traffic control towers and computer drafting rooms.

Figure 13:
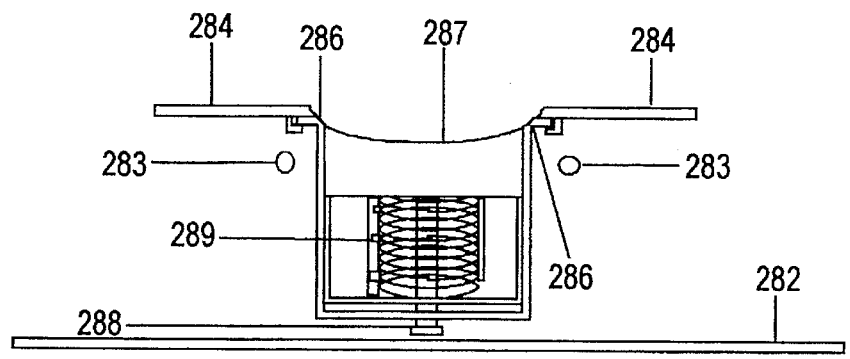
FIG. 13 shows a key mechanism of the present invention.
Figure 14:
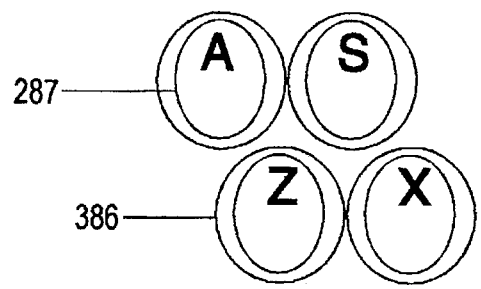
FIG. 14 shows keys according to the present invention.

Referring to FIGS. 13–14, a key mechanism 281 and keys 381 are shown. Key mechanism 281 comprises keyboard surface 284, keyboard control circuit pad 282, activator 288, spring 289, optic elements 283, key pad 287 and key housing 286. Optic elements 283 provide light to housing 286 for illuminating key perimeter 386, as shown in FIG. 14. Moreover, key pad 287 can be made of a substantially translucent material, as is key housing 286, for providing back-lighting of a key pad. Key pads 287 and key housings 286 can be made of varying colors, including being clear.

Moreover, the art as taught by the present invention can be practiced with keyboards other then the type as described herein. By way of example and not limitation, musical type keyboards can be used with art as taught by the present invention.

Moreover, by way of example and not limitation, specially designed keyboards can be used with the art as taught by the present invention, e.g., airport traffic controller keyboards, on-line database keyboards and banking keyboards, among others.

Right keyboard section 200 also comprises a right power on/off indicator 280. Right keyboard section 200 can be powered by chemical battery, solar cell, or some other electrical means well-known in the art of the present invention. Right power on/off indicator 280 would then indicate whether power is being drawn from such a power source. Moreover, in order to conserve power, keyboard keys 205 can be touch-sensitive, e.g., when not in use for a predetermined amount of time, right keyboard section 200 would be turned off; and/or right, left or both keyboard sections could have on/off switches for mutual or independent activation or deactivation.

Right keyboard section 200 also comprises release button 260. Release button 260 is positioned for actuation by the right thumb. Release button 260 allows an operator to release right keyboard section 200 from a prior locked position for removing said section from right keyboard support 195. The release mechanism is described in more detail elsewhere in this specification.

Left keyboard section 300 is similar to right keyboard section 200. Notably different are keyboard keys 305, the left half of a standard computer keyboard set. Typewriter keys 320 are the standard division of keys for actuation by the left hand on a QWERTY standard keyboard. Moreover, function key 315 is the typical function key dividing a standard computer keyboard for actuation by the left hand. Left keyboard section 300 also includes space bar 330, Control key 395 and Alt key 390. Space bar 330 is positioned for actuation by the left thumb, wherein the left thumb is in natural position for actuating space bar 330 for thumbs with varying lengths. Control key 395 and Alt key 390 are positioned for actuation by either the left index finger or the left thumb.

Left keyboard section 300 also includes left power on/off indicator 380. Moreover, a power level meter for monitoring the remaining amount of power left in a power means, not shown, for supplying power to left and right keyboard sections 200 and 300 can be included. Also included is frequency monitor 350. Frequency monitor 350 allows the operator to set a frequency of operation for left and right keyboard sections 200 and 300. The frequency of operation is for communication with a computer.

However, more than one computer can be accessed by adjusting the frequency of transmission. Additionally, data input can be for reception by devices other than a computer. As explained above, keyboards other than computer keyboards are contemplated for use with the present invention. Moreover, a variety of computer keyboard types can be used with the present invention. By way of example and not limitation, a computer keyboard incorporating a track ball can be used with the present invention.

Thus, keyboard sections 200 and 300 can communicate or transmit data signals to a computer without being physically attached to the computer. Frequency monitor 350 also monitors the frequency of use and provides an LCD display therein. Communicating by electromagnetic (EM) waves is well-known in the art of the present invention, and thus, means well-known in the art of the present invention can be employed in practicing the art as taught by the present invention. By way of example and not limitation, spread spectrum technology, as disclosed in "The ARRL Spread Spectrum Sourcebook," edited by Andre Kesteloot and Charles L. Hutchinson, published by The American Radio Relay League, Inc., Copyright 1991, can be used with the present invention, especially an article by Paul L. Rinaldo in Chapter 5, dated Nov. 1980, discussing how spread spectrum signals can be encoded and decoded to prevent unintended use or cross-talk. Moreover, as a low power consumer, spread spectrum allows safer operation by a user in close proximity than more powerful transmitters. Furthermore, low power consumption is desirable with the present invention to increase mobility with a relatively mobile power source.

Left keyboard section 300 also includes release button 360. Release button 360 is similar to release button 260, except the release button 360 controls release of left keyboard section 300, as disclosed elsewhere in this specification. Moreover, right and/or left keyboard sections right and left release buttons could be such that using either allows for release of both keyboard sections.

Also, right and left keyboard sections 200 and 300 are contoured to fit the natural position of a human wrist and hand. Both right and left keyboard sections 200 and 300 include wrist pad 270, end grip slot 240 and contour 450. Contour 450 is naturally shaped for placement of the hand upon the keyboard. End grip slot 240 is located for natural positioning of the operator's wrist onto the keyboard and for movement of the keyboard/adjustable arm when positioning for use. Additionally, wrist pad 270 is located to fit the contour between the operator's wrist and arm. Wherein tensions and stresses due to keyboard use are reduced.

The contour of right and left keyboard sections 200 and 300 are more understandably viewed with reference to FIG. 12. In FIG. 12, a frontal view of right and left keyboard sections 200 and 300 are shown. With respect to right keyboard section 200, contours 452 and 453 are shown. Contours 452 and 453 are shaped for ergonomic conforming to the right hand of a user. Thus, contour 452 conforms to right hand operation of essentially alpha keys, and contour 453 conforms to right hand operation of essentially numeric keys. Left keyboard section 300 is similarly shaped for operation by the left hand of a user. Contour 451 is similar to contour 452, except that it is shaped for operation with the left hand. As can be seen with reference to FIG. 6, the keyboard is shaped both for upward elevation, as well as arcking downward on the sides to more ergonomically fit the shape of a human hand.

Figure 7:
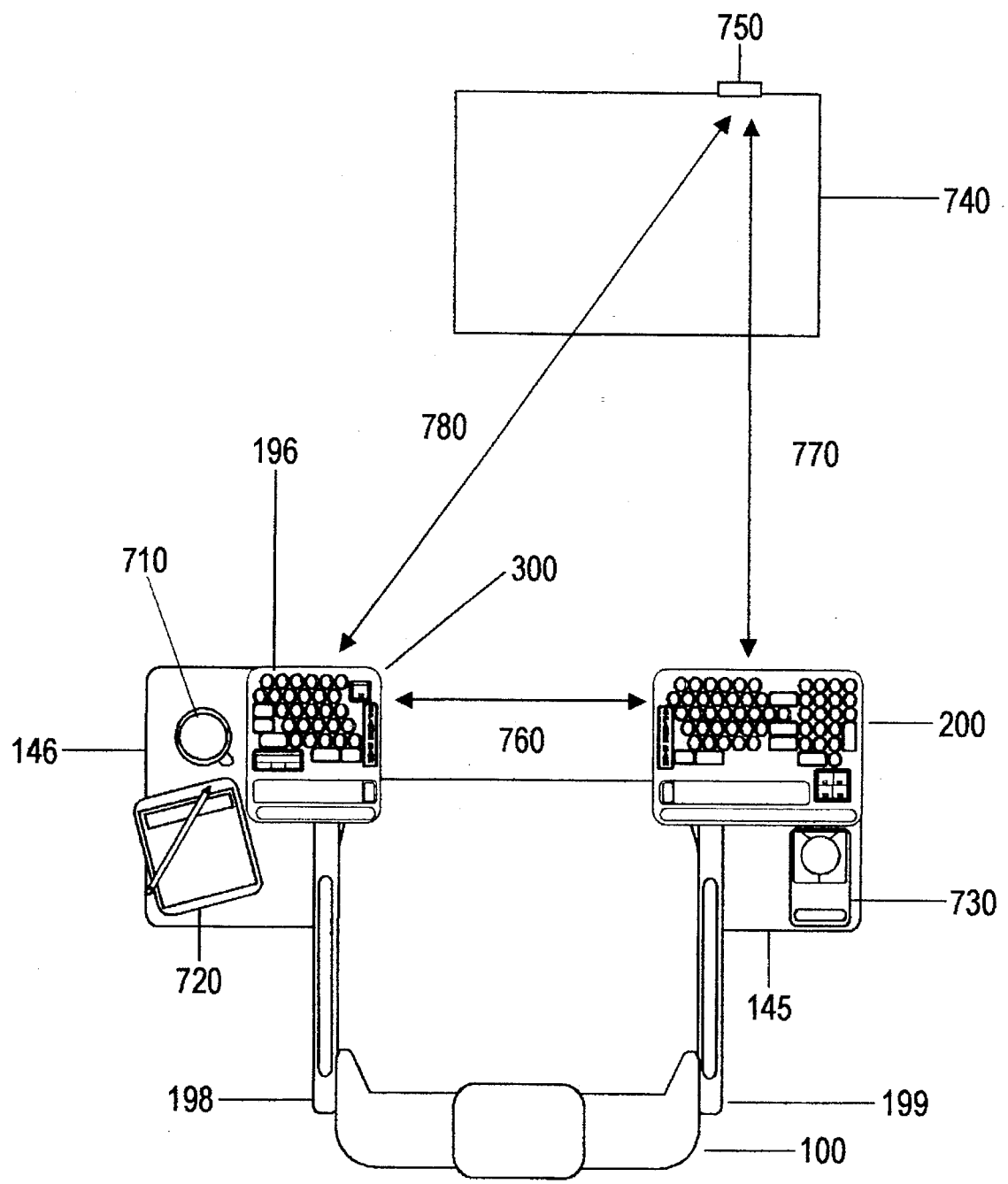
FIG. 7 shows the variably adjustable chair and split keyboard combination of the present invention in one mode of usage.
Figure 8:
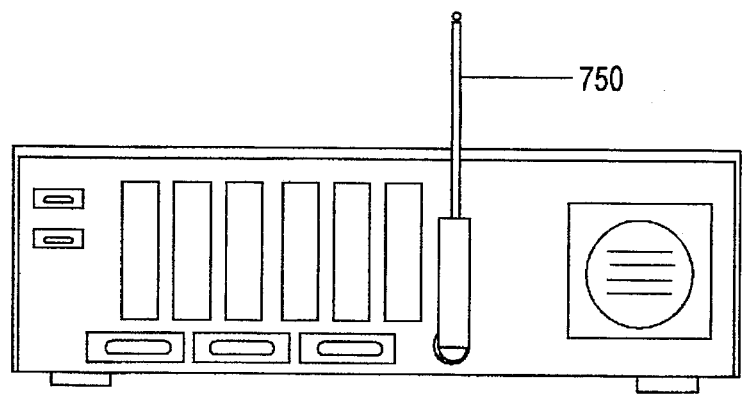
FIG. 8 shows a computer with a receiving means according to the present invention.

In FIGS. 7 and 8, one embodiment of the present invention is shown. Variably adjustable chair 100 comprises left and right adjustable arm assemblies 198 and 199, left and right auxiliary supports 146 and 145, left and right keyboard section 300 and 200, and left keyboard support 196, shown, and right keyboard support 195, not shown. Also shown for use with the present invention are cup 710, sketch pad 720 and track ball 730. Auxiliary support 146 can include a cup holder in order to hold cup 710. Additionally, peripheral devices normally associated with computer use such as a graphics sketch pad 720 and a track ball 730 can be used in combination with the present invention, and in particular with auxiliary supports 146 and 145.

Also shown is computer 740 and receiving means 750. Receiving means 750 is a receiver for receiving EM waves sent by right and left keyboard sections 200 and 300. Lines 780 and 770 represent potential directional pathways for EM waves. Additionally, keyboard sections 200 and 300 can be communicating with one another through pathway 760, or can be hard-wired together in chair 100, not shown. Moreover, frequency transmission means, not shown, allow sections 200 and 300 to be used to communicate with computer 740 through receiving means 750. Notably, transmission means could be included in one of keyboard sections 200 and 300, when keyboard sections 200 and 300 are hard-wired together. Also, means other than EM waves can be used for communications with a computer. Such means include infrared (IR), laser, or cabling to the computer 740 directly. However, in the preferred embodiment of the present invention, no physical connection with the computer or a power outlet is required. Thus, the present invention can be moved away from a computer and/or power outlet. In the preferred embodiment radio waves are used to communicate with the computer. These radio waves are omni-directional, and thus the variably adjustable chair 100 can be positioned such that the operator does not have to look at the computer when using the present invention.

Transmitter means are well-known in the prior art of the present invention. Additionally, receiver means are well-known in the prior art of the present invention. By way of example and not limitation, a transmitter can be constructed according to the principals of the present invention for modulating digital information onto a carrier wave, which could then be received by a receiver for demodulating the digital information for further processing. The receiver could be fabricated onto any input/output card for placement into a computer, built into a computer, connected by cable to a computer, or otherwise coupled to a computer for receiving and processing data.

Referring to FIGS. 15–18, control panel 500, control button mechanism 511 and chair 100 are shown. Control panel 500 comprises lock on/off button 501, footrest button 502, chair forward or back button 503, chair up or down button 513, arms tilt forward or back button 504, arms forward or back button 505 and arms in or out lock button 506. Control panel 500 is for controlling various operations of the chair as described elsewhere in this specification. As is well known in the prior art of the present invention, pneumatic controls can be controlled for a variety of movements. While not all of the functions disclosed on control panel 500 are disclosed herein in order to prevent unnecessary obscuring of the present invention, it should be understood that such functions are possible in accordance with the teachings of the present invention.

Figure 17:
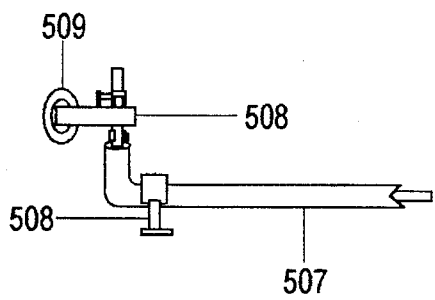
FIGS. 16–17 show a control button mechanism according to the present invention.
Figure 16:
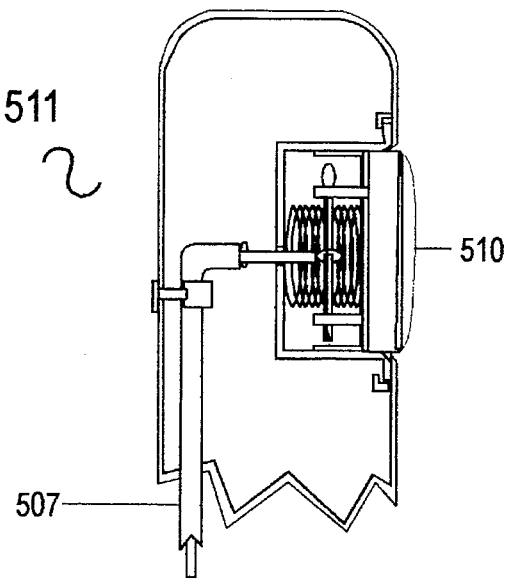

FIGS. 16–17 show control button mechanism 511. Button 510, which can be any of the buttons described with reference to control panel 500 activates connecting cable 507 is coupled to pneumatic means 509 and held in place with clamps 508. In this manner, pneumatic means 509 can be adjusted. While control button mechanism 511 has been shown herein, it should be understood that a variety of mechanisms, including both mechanical and electrical as well as others, well known in the prior art of the present invention can be employed herein without departing from the spirit and scope of the present invention.

Figure 18:
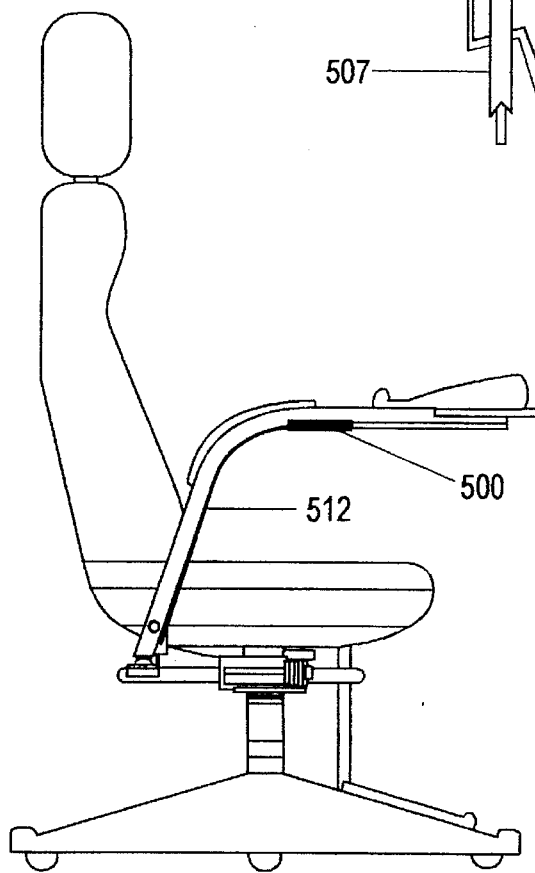
FIG. 18 shows an embodiment of the present invention having a control panel.

FIG. 18 shows an alternate embodiment of the present invention, namely, chair 100 with control panel 500 and control cables 512. Control cables 512 are coupled to pneumatic means as disclosed elsewhere in this specification. In this manner, an operator can adjust chair 100 to ergonomically conform to individual needs.

Referring to FIGS. 19–24, adjustable hinge angle assembly 520 and various components therein are shown. Adjustable hinge angle assembly 520 comprises support hinge 513, release/lock 514, positioning means 516, arm 548 and ratchet hinge 515.

Positioning means 516 comprises springs 519 and 521, lower sleeve-portion 571, pin 572 and upper sleeve-portion 570. Arm 548 comprises spring 573, sliding arm 574 and support arm 576. As sliding arm 574 is connected to lower sleeve-portion 571, pushing release/lock 514 inwardly along 578 causes lower sleeve-portion 571 to drop, as shown in FIG. 22. Pin 572 allows pivotal motion of lower sleeve-portion 517, and maintains coupling to upper sleeve-portion 570. Upper sleeve-portion 571 is rigidly mounted to ratchet hinge 515. Rachet hinge 515 comprises stationary bands 575 and rotatable bands 579, as shown in cross-section B–B'. Support arm 576 is rigidly mounted to upper sleeve-portion 570. Gear post 518 is controlled with control 516 through release/lock 514. Gear post 518 is coupled to housing 537 as means for adjusting tilt via gear post 518. Stationary bands 575 are rigidly mounted to housing 573, which in turn is mounted to end 581. Bands 579 are connected to support hinge 513. Activating release lock 514 enables control 516 to be released, shown in FIG. 22 as position 538. Position 517 as shown in FIG. 21 is the lock position. FIG. 23 is a cross section 522 along A–A', which exposes tension control springs 519 and 521. Spring 573 returns release/lock 514 to a lock position after a desired angle is reached. In the preferred embodiment of the present invention, adjustable hinge assembly 520 can be adjusted for angles from 0 to 90 degrees. Wedge 577 meshes with gear post 518 to allow an operator to adjust adjustable hinge angle assembly 520 to a desired position. As shown in FIG. 24, adjustment hinge angle assembly 520 can be housed in support 533, which can be either a right or left keyboard support 195 or 196, for housing adjustment hinge angle assembly 520. Adjustment hinge angle assembly 520 can be part of hinge 540 as shown. Hinge 540 is described elsewhere in this specification in more detail.

Figure 25:
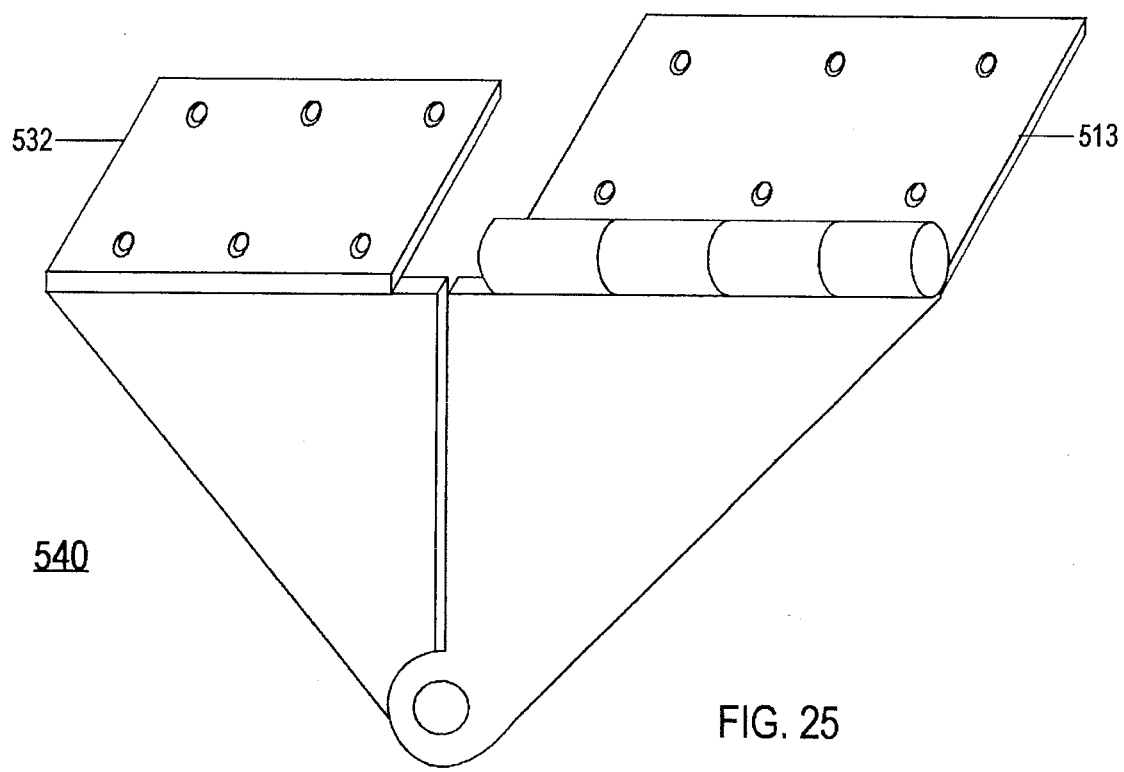
Figure 26:
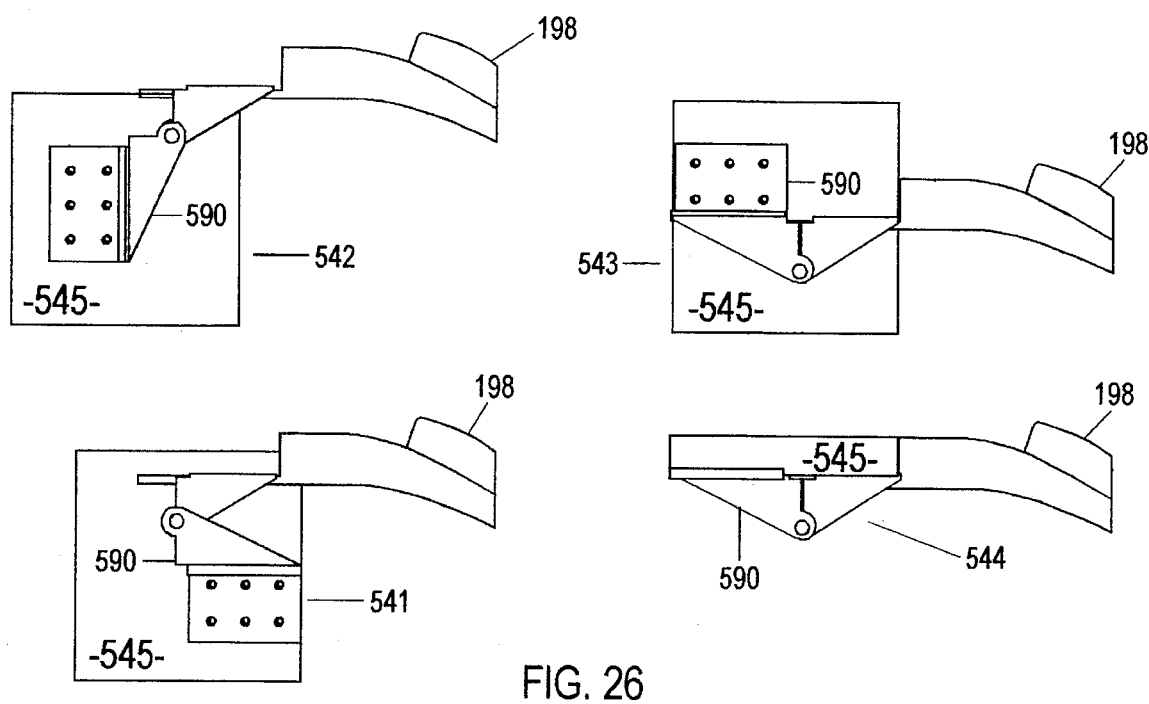

Referring to FIGS. 25–26, right hinge 540 and various positions of left hinge 590 are shown. Hinge 540 is for mounting onto an adjustable arm as disclosed in the present invention, and for mounting to a keyboard and/or auxiliary support as disclosed herein. For example, hinge 532 can be mounted onto an adjustable arm, and hinge 513 can be mounted onto a keyboard support. Position 541 is the down or out of use position. Position 542 and 543 indicate intermediate positions for positioning keyboard support 545. Position 544 shows a use position for keyboard support 545. Other positions for use can be maintained as disclosed elsewhere in the specification when, as with the preferred embodiment, adjustment hinge angle assembly 520 is used.

Other means for articulating keyboard supports in angled positions and locking them in position therein can be used in practicing the art as taught by the present invention.

Referring to FIGS. 27–29, mechanisms for detachably mounted keyboard sections are shown. Referring to FIG. 27, right and left keyboard sections 200 and 300 are shown. Additionally, the right bottom and left bottom 201 and 301 of right keyboard sections 200 and 300, respectively. Right bottom section 201 comprises tabs 204, locating protrusion 203 and having opening 202. Left bottom section 301 similarly comprises optional tabs 304, elevated protrusion 303 and having opening 302. As shown in FIG. 28 with right keyboard section 200, bore 547 is used for positioning right keyboard section 200. Board 547 fits into opening 202. Additionally, optional pin 206 can be used for locking right keyboard section 201 with mechanism 548 to right adjustable arm assembly 199. Alternatively, as described elsewhere in this specification, a release button on the keyboard can be used for releasing right keyboard section 200 from adjustable arm assembly 199. Such mechanisms are well-known in the prior art of the present invention. Additionally, similar means can be used for left arm assembly 198.

Referring to FIG. 29, supports 549 are shown. Supports 549 are smaller than supports 195 and 196 for improved ingress and egress as described elsewhere in this specification. Also, as shown is groove 551. Groove 551 allows for protrusion 203 and 303 to relocate to fit therein for locating right and left keyboard sections 200 and 300. Such assemblies for locating right and left keyboard sections can be for supports 549 and/or supports 195 and 196. Other methods and configurations of varying degrees in shapes and sizes can be used in practicing the present invention without departing from the spirit and scope of the present invention.

Figure 30:
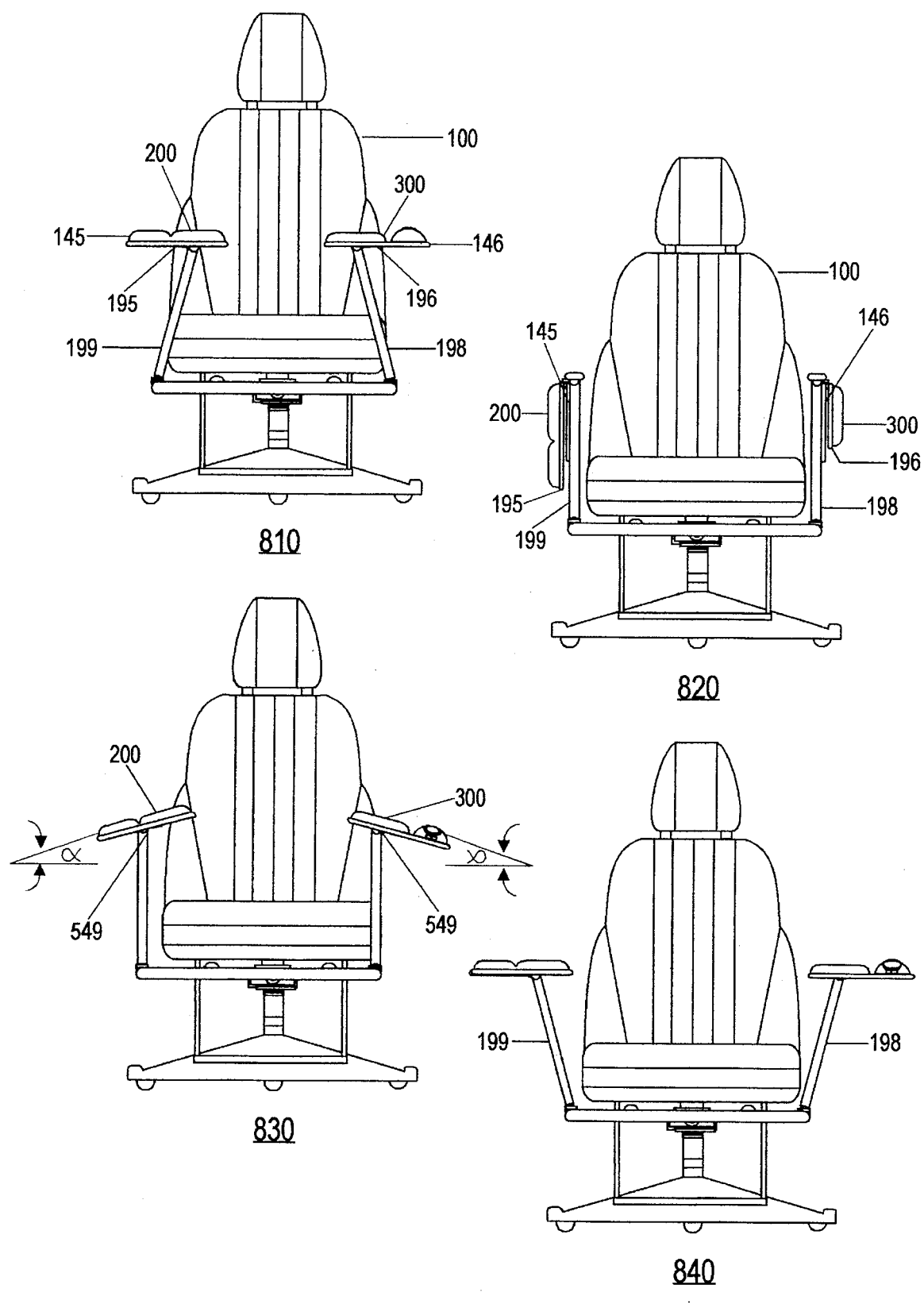
FIGS. 30–31 show some modes of use according to the present invention.

Referring to FIG. 30, positions 810–840 are shown. In position 810 adjustable arm assemblies 198 and 199 are inwardly angled substantially as shown. In position 820, keyboard sections 200 and 300, supports, 195 and 196, and auxiliary supports 145 and 146 are located in a folded down, out of use, position substantially as shown. Position 830 shows right and left keyboard sections 200 and 300 and supports 549 angled at an angle alpha. Angle alpha can be any of a variety of angles as applicable with adjustment hinge assembly 523. In position 840, adjustable arm assemblies 199 and 198 are angled outwardly substantially as shown. A variety of positions for use and non use can be accomplished with the teachings and disclosures of the present invention herein. It should be understood that the present invention can be adjusted according to an individual operator's desires.

Figure 31:
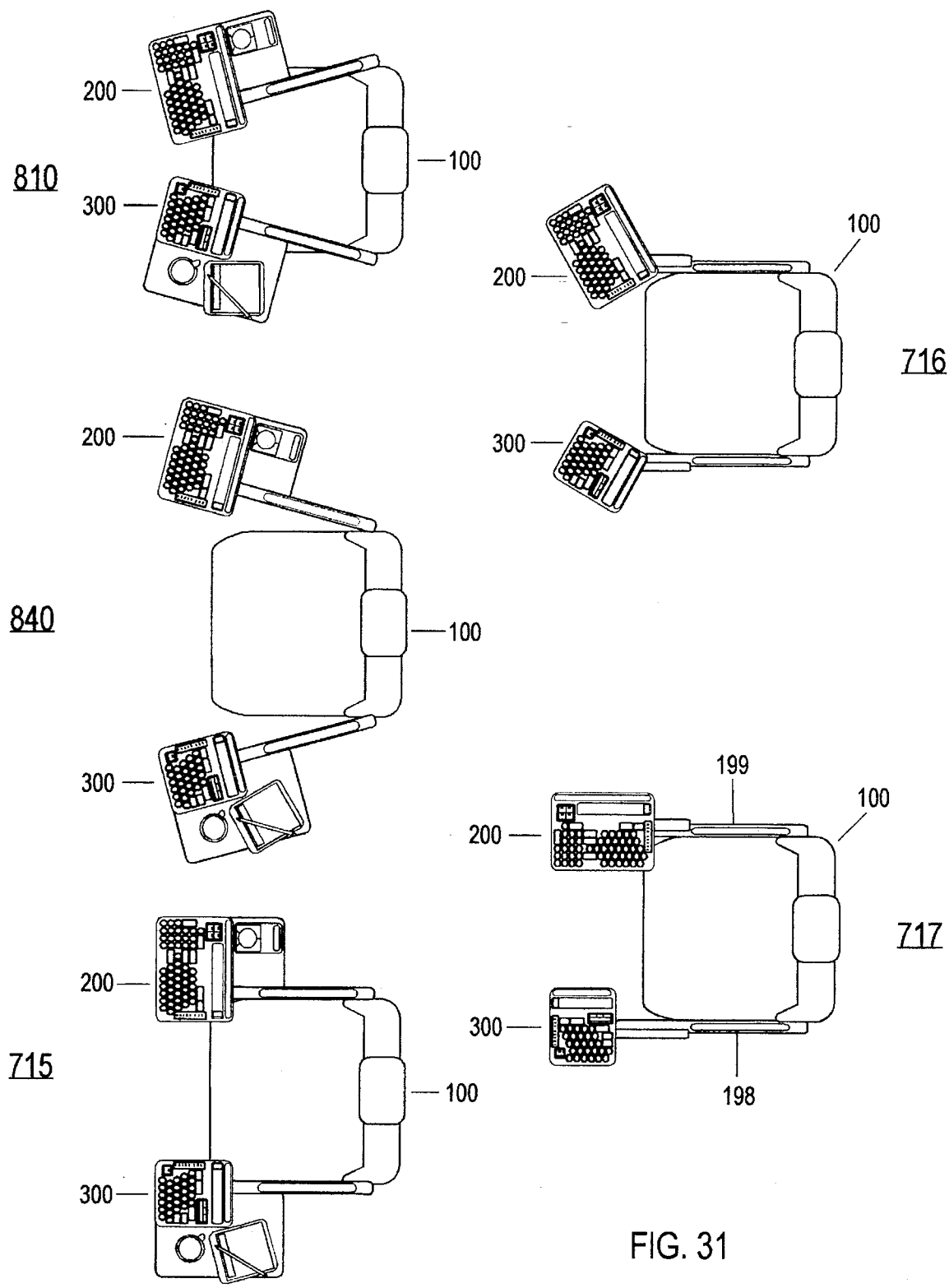

Referring to FIG. 31, positions 810, 840 and 715–717 are shown. Position 810, a top view of chair 100 is shown. In position 840 a top view of chair 100 is shown. In position 715 a top view of chair 100 is shown with keyboard sections 200 and 300 ostensibly perpendicular to chair 100 is shown. In position 716, a top view of chair 100 is shown with keyboard sections 200 and 300 outwardly angled for an optional use position. In position 717, keyboard sections 200 and 300 are shown outwardly angled, substantially parallel to adjustable arm assemblies 199 and 198, respectively, for ingress and/or egress to chair 100. It is contemplated in position 717 that supports 549 are used in order to effectuate a greater degree of freedom, i.e., more space for ingress and egress to chair 100.

The present invention has been particularly shown and described with respect to a best mode and features thereof. However it should be readily apparent to those of ordinary skill in the art that various changes and modifications in form and detail may be made without departing from the spirit and scope of the invention as set forth in the appended claims. Moreover, the invention illustratively disclosed herein may be practiced in the absence of any element which is not specifically disclosed herein.

What is claimed is:

1. An improvement in a computer, keyboard and chair arrangement for reducing stress and tension experienced by a human operator, said computer including receiving means for receiving data signals, said chair of a type having a seat and a base, said seat positionally oriented along an x-axis, a y-axis and a z-axis, the improvement comprising:

first and second adjustable arms, said adjustable arms including:
  a. first and second locking means for locking said first and second adjustable arms in position, said first and second locking means mounted to said base, said first and second locking means defining first and second bores;
  b. a rod frame composed in part of first and second rods respectively located in said first and second bores for adjustably locating said first and second adjustable arms, said first and second rods for slidable movement respectively between first and second distal positions and first and second proximal positions from said first and second locking means, said first and second rods movable in a direction substantially parallel to said x-axis, said first and second locking means for locking said first and second rods in position;
  c. first and second motional means respectively connected to said rod frame for movement of said first and second adjustable arms;
  d. first and second cantilevered arms, one end of said first and second cantilevered arms respectively connected to said first and second motional means for curvilineal and axial movement, said first and second cantilevered arms capable of curvilineal movement in three planes defined by said x-axis, said y-axis and said z-axis, said first and second cantilevered arms axially movable partially about said z-axis for vertical movement in said y-axis and horizontal movement in said x-axis, said first and second cantilevered arms axially movable partially about said x-axis for vertical movement in said y-axis and lateral movement in said z-axis, said first and second cantilevered arms rotatable about said y-axis for lateral movement in said z-axis and horizontal movement in said x-axis, an end opposite said one end of said first and second cantilevered arms may be moved in a space above said seat defined by said x-axis, said y-axis and said z-axis, said end opposite said one end of said first and second cantilevered arms each capable of being simultaneously moved in the three planes, defined by said x-axis, said y-axis and said z-axis, said end opposite said one end of said first and second cantilevered arms further capable of being simultaneously pivoted in a horizontal plane defined by said x-axis and said z-axis and in a vertical plane defined by said x-axis and said y-axis; and
  e. first and second supports pivotally mounted to the other end of said first and second cantilevered arms respectively, said first and second supports pivotally mounted for movement respectively between first and second down positions and first and second up positions, said first and second down positions substantially co-planar with planes defined by said x-axis and said y-axis, said first and second up positions substantially co-planer with planes defined by said x-axis and said z-axis;
  f. pneumatic means for controlled positioning of said first and second adjustable arms connected to said first and second cantilevered arms and to said rod frame;

first and second keyboard sections coupled to said first and second supports, respectively, said first and second sections having predetermined keys located thereon, said predetermined keys arranged in first and second predetermined patterns on each said first and second section, one said first and second section for operation with one hand and the other said first and second section for operation with the other hand, said first and second keyboard sections for producing electronic signals; and transmission means coupled to said first and second keyboard sections for transmitting said electronic signals to said receiving means;

wherein an operator can adjust the position of said adjustable arms and said first and second keyboard sections for reduced stress and tension.

2. The improvement of claim 1, wherein each said first and second keyboard sections are contoured for reduced stress and tension.

3. The improvement of claim 2, wherein each said first and second keyboard sections have a space bar, each said space bar positioned on each said first and second keyboard sections for natural placement of the thumb.

4. The improvement of claim 3, wherein each said first and second keyboard sections include a wrist pad for reduced stress and tension.

5. The improvement of claim 2, wherein said first and second motional means include ball joints.

6. The combination of claim 1, wherein said first support is pivotally mounted to said cantilevered arm with a hinge.

7. The combination of claim 6, wherein said hinge includes ratchet means for adjustably locating and maintaining said first support at a determined angle.

* * * * *